April 11, 1950     R. H. ARBIB     2,503,988
DISPLAY DEVICE
Filed Dec. 11, 1947
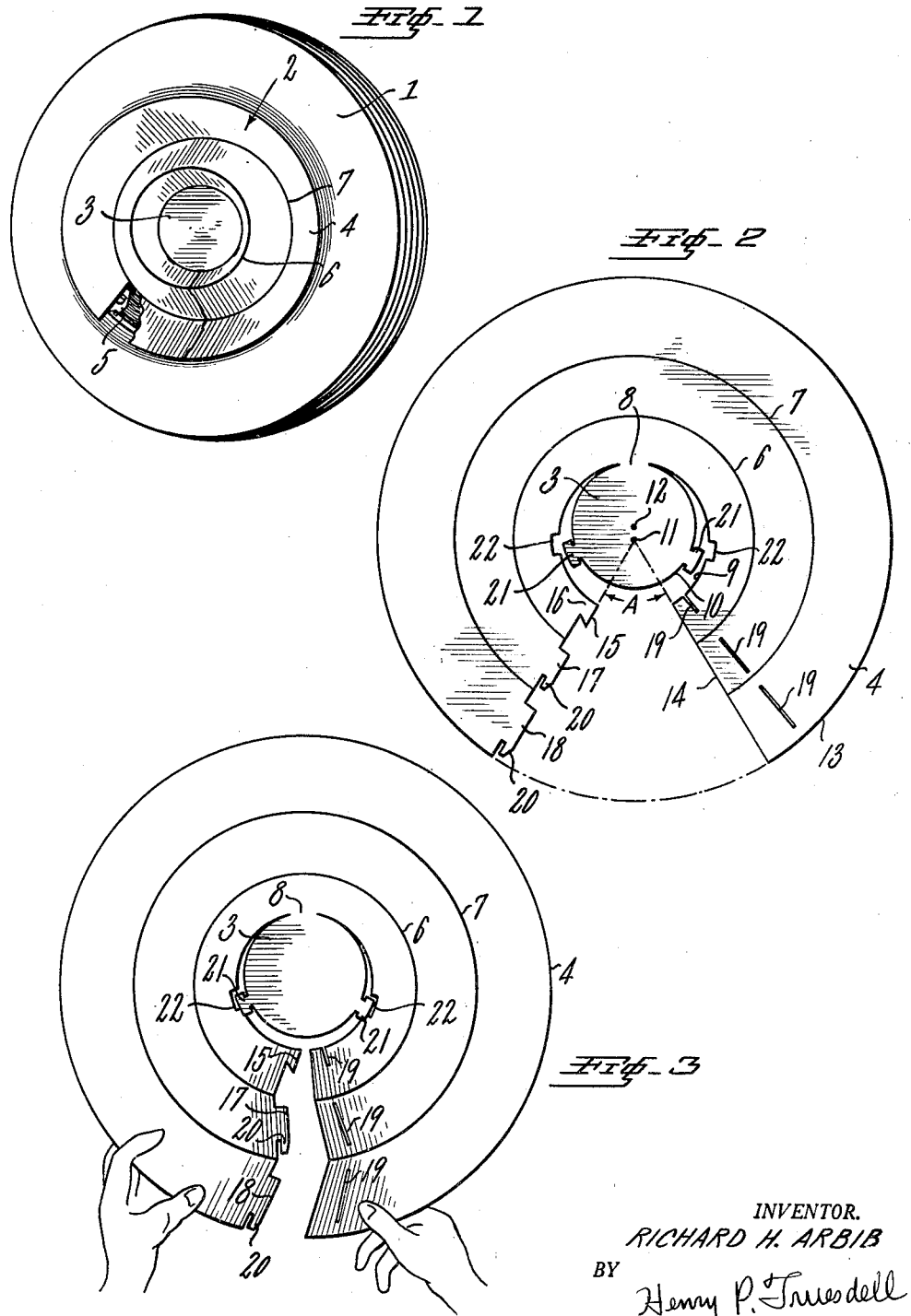
INVENTOR.
RICHARD H. ARBIB
BY Henry P. Truesdell
ATTORNEY Patented Apr. 11, 1950

2,503,988

UNITED STATES PATENT OFFICE 2,503,988

DISPLAY DEVICE

Richard H. Arbib, Huntington Woods, Mich., assignor to United States Rubber Company, New York, N. Y., a corporation of New Jersey Application December 11, 1947, Serial No. 791,097

1 Claim. (Cl. 40—125)

My invention relates to a display device and more particularly to a display device for use in promoting the sale of pneumatic tires.

It is an object of my invention to provide a new and improved display device for tires which is so constructed and arranged as to represent the configuration of the wheel on which the tire is mounted.

It is another object of my invention to provide a tire display device to which different selected advertising material may be added for selling different brand names of tires.

A further object of my invention is to provide a tire display device which may be made from sheet material and which is of simple construction so that it may be manufactured at low cost.

In the accompanying drawing Fig. 1 is a perspective view of my display device mounted in position on a tire; Fig. 2 illustrates the device as punched from flat sheet material; and Fig. 3 shows the manner in which the display device is assembled.

Referring to the drawing, Fig. 1 illustrates a pneumatic tire 1 in the center of which is mounted a display device 2 constructed from flat sheet material in accordance with my invention. The display device is given a configuration corresponding to that of one of the disc wheels which are in popular use today. To this end, the device is provided with a centrally disposed plate 3 which simulates the wheel hub and an outer surrounding disc 4 which corresponds to the main body of the disc wheel on which the tire is mounted.

The display device is so constructed as to simulate a disc wheel in a very realistic way. It makes it possible for the tire dealer to display a considerable number of tires without the expense of providing a real disc wheel on which to mount them. The center plate 3 may carry any suitable design or insignia; it will probably be used to carry the brand name of the tire being displayed. By changing the advertising material on the plate 3 the display device is suitable for use with any brand tire.

In order to mount the device on a tire, the rear surface of the display carries a plurality of clips 5 which engage the tire bead wall. The outer disc 4 is provided with a ridge 6 and a groove 7 which are concentric with the plate 3. These lines serve to give the surface of the display sloping configurations similar to that of an actual disc wheel. In addition, they make it possible to construct the display device from flat sheet material in a manner now to be described.

To this end, the display device may be punched from a flat sheet of material in the form illustrated by Fig. 2. It should be manifest that any suitable low cost sheet material may be used such as paper, cardboard, thin sheet metal or thin laminated sheets of plastic material although I prefer to use cardboard. The device may be cut in a single operation. In doing this, the center plate 3 is formed substantially as a circle which is joined to the outer disc 4 along a portion of its periphery at the point indicated by the numeral 8. The outer disc 4 is formed as a ring or annulus the inner edge 9 of which is spaced a varying distance from the edge 10 of the plate 3. In actual practice, the edge 9 is formed by circumscribing a circle from the center 11 on the plate 3 which is offset from the geometric center 12 of the plate from which the plate edge 10 is circumscribed. This means that the circles formed by the edges 9 and 10 are eccentric with respect to each other except at the small area 8 where the circles are tangent. The effect is that the plate 3 is hinged to the disc 4 at the point 8. The outer edge 13 of the disc 4 is similarly formed by scribing a circle from the center 11 so that the inner and outer edges 9 and 13, are concentric. Similarly, the ridge 6 and depression 7 are formed as circles circumscribed about the radius point 11. At the time that the disc 4 and plate 3 are punched from the sheet material the ridge 6 and groove 7 are scored or indented slightly in the surface of the material so that it may be folded along these lines when the display device is completely assembled for mounting on a wheel.

In order to fold the blank thus formed into a circle for mounting on the wheel a segment indicated by the angle A is removed from the disc 4. One side of the segment forms a radial edge 14; the other side forms a radial edge 15 which is formed with a plurality of projections 16, 17 and 18. The projections are formed for insertion in slits 19 formed in the disc adjacent the edge 14. The projections 17 and 18 are provided with tangs 20 which lock with the corresponding slits 19 to hold the disc 4 in assembled position. The center plate 3 itself is provided with a plurality of projecting tangs 21 which cooperate with recesses 22 formed in the edge 9 of the disc and which serve to hold the plate centered in position on the disc. It should be manifest that the entire display device illustrated in Fig. 2 may be cut from flat sheet material in a single punching operation and that thereafter it may be assembled to circular shape for mounting on the tire.

In assembling the device, the two edges 14 and 15 of the disc 4 are brought together so that the disc, in effect, is wrapped around the center plate 3, in the manner illustrated by Fig. 3. At this time the tangs 21 on the center plate are seated in the recesses 22 in the inner edge 9 as the two edges are drawn together. Then the projection 18 is inserted through the corresponding slit 19 and locked in position by means of the tang 20. Next the projection 17 is inserted through the middle slit 19 and locked in position. By this time the two edges 14 and 15 will have been drawn together in slightly overlapping relationship and the remaining projection 15 will project through the remaining slit 19 which merges with the edge 9. As thus assembled, the display device takes the shape of a disc wheel and is ready for mounting in the tire.

It should be noted that as the edges of the disc 4 are drawn together that the sheet material will fold or bend along the lines formed by the scorings of the ridge 6 and grooves 7 to permit the disc to be contracted somewhat in size around the center plate 3. The advantage of this arrangement is that it permits the entire display device to be made of flat relatively inextensible material, such as paper or cardboard, which can then be assembled in a manner such that it is representative of the configuration of disc wheel having sloping walls formed by the circular ridge 6 and grooves 7. The walls of the disc adjacent the ridge 6 and groove 7 will vary in slope and will move relative to each other as the edges 14 and 15 are drawn together in contracting the disc 4.

My display device is one which may be easily constructed of low cost material. It may be made in various diameters depending upon the size of tire which is to be used with the display. It will be apparent that the diameter of the disc 4 and the plate 3, as well as the spacing of the centers 10 and 11, may be varied at will depending upon the particular size and configuration of the display.

Having thus described my invention, what I claim and desire to protect by Letters Patent is:

A display device for mounting in a pneumatic tire comprising a piece of sheet material cut out so as to have a circular central plate simulating the wheel hub, an outer circular disc cut out on a center spaced from the center of said central plate, said plate being joined to the disc over a small area, said disc having a segment cut out to form radially extending edges, and circular scorings on the surface of said disc concentric therewith whereby the surface of the disc, when the radial edges thereof are brought together, forms a simulated disc wheel with ridged and grooved areas.

RICHARD H. ARBIB.

REFERENCES CITED

The following references are of record in the file of this patent:

UNITED STATES PATENTS

| Number | Name | Date |
|---|---|---|
| 1,809,298 | Heywood, Jr. | June 9, 1931 |
| 2,185,866 | Paige | Jan. 2, 1940 |